(12) United States Patent
Pauli

(10) Patent No.: US 10,186,093 B2
(45) Date of Patent: Jan. 22, 2019

(54) SYSTEM AND METHOD FOR MONITORING MACHINE HAULING CONDITIONS AT WORK SITE AND MACHINE INCLUDING SAME

(71) Applicant: Caterpillar Inc., Peoria, IL (US)

(72) Inventor: Nathan S. Pauli, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 88 days.

(21) Appl. No.: 15/382,009

(22) Filed: Dec. 16, 2016

(65) Prior Publication Data

US 2018/0174378 A1  Jun. 21, 2018

(51) Int. Cl.
| | |
|---|---|
| *B60G 9/02* | (2006.01) |
| *B60P 1/04* | (2006.01) |
| *G07C 5/08* | (2006.01) |
| *G01C 21/36* | (2006.01) |
| *G01M 17/04* | (2006.01) |
| *G01S 19/13* | (2010.01) |
| *G06F 17/30* | (2006.01) |

(52) U.S. Cl.
CPC ............... *G07C 5/085* (2013.01); *B60G 9/02* (2013.01); *G01C 21/3697* (2013.01); *G01M 17/04* (2013.01); *G01S 19/13* (2013.01); *G06F 17/30345* (2013.01); *G07C 5/0808* (2013.01); *G07C 5/0825* (2013.01); *B60G 2300/09* (2013.01); *B60G 2400/51222* (2013.01); *B60G 2400/824* (2013.01); *B60P 1/04* (2013.01)

(58) Field of Classification Search
None
See application file for complete search history.

(56) References Cited

U.S. PATENT DOCUMENTS

| | | | |
|---|---|---|---|
| 4,691,792 A | 9/1987 | Shintani | |
| 4,835,719 A | 5/1989 | Sorrells | |
| 4,887,454 A | 12/1989 | Krytsos et al. | |
| 5,531,122 A | 7/1996 | Chatham et al. | |
| (Continued) | | | |

FOREIGN PATENT DOCUMENTS

| | | |
|---|---|---|
| EP | 2208971 A1 | 7/2010 |
| WO | 2010040403 | 4/2010 |

*Primary Examiner* — Rami Khatib
(74) *Attorney, Agent, or Firm* — Oblon, McClelland, Maier & Neustadt

(57) ABSTRACT

A machine includes a frame, a suspension system mounted to the frame and including a strut, and a hauling condition monitoring system supported by the frame. The hauling condition monitoring system includes a pressure sensor arranged with the strut, a geolocation unit, a computer-readable medium bearing a hauling condition monitoring program, a controller, and an interface device. The controller is in operable communication with the pressure sensor and the geolocation unit to receive their signals and configured to execute the hauling condition monitoring program. The interface device is in operable communication with the controller and configured to display the hauling condition monitoring program's graphical user interface. The hauling condition monitoring program is configured to monitor the strut pressure signal for a hazard event that occurs when a dynamic change in the strut pressure exceeds a threshold amount and track the location of the machine when the hazard event occurred.

18 Claims, 3 Drawing Sheets

(56) References Cited

U.S. PATENT DOCUMENTS

| | | | |
|---|---|---|---|
| 6,184,784 B1 * | 2/2001 | Shibuya | B60C 23/0408 |
| | | | 180/167 |
| 6,293,141 B1 | 9/2001 | Nance | |
| 7,941,256 B2 * | 5/2011 | Namuduri | B60G 17/015 |
| | | | 340/522 |
| 8,188,887 B2 * | 5/2012 | Catten | G06F 17/30241 |
| | | | 340/425.5 |
| 9,092,915 B2 * | 7/2015 | Ikari | E01C 23/01 |
| 9,285,007 B2 | 3/2016 | Fazeli et al. | |
| 9,953,536 B1 * | 4/2018 | Kerr | G08G 1/166 |
| 2004/0129834 A1 | 7/2004 | Luce | |
| 2005/0278089 A1 | 12/2005 | Lueschow | |
| 2006/0144997 A1 | 7/2006 | Schmidt et al. | |
| 2006/0152352 A1 | 7/2006 | Moughler | |
| 2006/0207809 A1 | 9/2006 | Casey | |
| 2008/0004763 A1 | 1/2008 | Johnson et al. | |
| 2009/0289812 A1 | 11/2009 | Kim et al. | |
| 2011/0148856 A1 | 6/2011 | Sprock et al. | |
| 2011/0153214 A1 | 6/2011 | Sprock et al. | |
| 2012/0053783 A1 | 3/2012 | Nance | |
| 2012/0053784 A1 | 3/2012 | Schmidt et al. | |
| 2014/0088822 A1 | 3/2014 | Jensen | |
| 2014/0309850 A1 | 10/2014 | Gabibulayev | |
| 2015/0020609 A1 | 1/2015 | Gogolin | |
| 2015/0269794 A1 | 9/2015 | Fazeli et al. | |
| 2015/0291177 A1 | 10/2015 | Lee | |
| 2015/0367963 A1 | 12/2015 | Swearingen et al. | |
| 2016/0035149 A1 | 2/2016 | Friend | |
| 2016/0069675 A1 | 3/2016 | Bando et al. | |
| 2016/0196749 A1 | 7/2016 | Chen et al. | |
| 2016/0223387 A1 | 8/2016 | Talmaki et al. | |
| 2016/0258118 A1 * | 9/2016 | Jinno | B60W 40/06 |
| 2016/0334798 A1 | 11/2016 | Foster et al. | |

\* cited by examiner

SYSTEM AND METHOD FOR MONITORING MACHINE HAULING CONDITIONS AT WORK SITE AND MACHINE INCLUDING SAME

TECHNICAL FIELD

This patent disclosure relates generally to systems and methods for monitoring a worksite and, more particularly, to systems and methods for monitoring the hauling conditions for machines at a worksite.

BACKGROUND

Off-highway machines are in widespread use in construction, mining, forestry, and other similar industries. Such machines can be used to transport material, such as, for example, ore, overburden, rock, sand, dirt, or gravel, from one location to another. In a typical work cycle at a worksite, the machine receives material in its dump body at one location, hauls the material in the dump body along a haul road to a second location at the worksite, and then dumps the material at the second location.

The conditions in which these machines are used can be severe. The worksite's haul roads may have ruts, potholes, large rocks, or other obstacles or hazards scattered about their paths. Workers at a worksite may regularly maintain the haul roads at a worksite to mitigate such road obstacles or hazards once they are identified. However, many of the obstacles are dependent on the particular conditions of the worksite, including its location and the local weather conditions, for example, and may arise without advance warning and in unpredictable locations. As such, completely eliminating such obstacles and hazards at a worksite is difficult, if not impossible, to accomplish.

Because these machines typically haul very heavy loads, when a machine travelling along a haul road encounters an obstacle (such as a bump or pothole, e.g.), the frame of the machine can be subjected to twisting and other structurally-damaging forces that can cause the structural components of the machine to fail prematurely. As hauling conditions of a worksite become more and more severe, the expected life of the structural components of the machine decreases. It would be very helpful for worksite management to be informed when a machine is being used at the worksite such that its expected life is being reduced.

Knowledge of potentially damaging worksite conditions would be useful to not only worksite managers, but also machine operators. For example, the driver could decrease the speed of the machine before it reaches a particular spot of the haul road which has been identified as having a road hazard, such as a bump or pothole, for example.

U.S. Pat. No. 4,887,454 is entitled, "Method for Monitoring a Work Vehicle Suspension" and is directed to a system and method monitoring the struts of a machine's suspension system. The struts contribute to the proper operation of the vehicle such that a single collapsed strut can have serious manifestations in structural damage, tire wear, and payload monitor accuracy. These consequences can be mitigated by an accurate and reliable strut monitor. According to the '454 patent, pressure type sensors are disposed on each of the struts and their pressure is monitored during three critical phases of operation. These phases include static, loading, and roading modes and each mode requires a distinct method for detecting a collapsing strut. The presence of a collapsing strut, detected by any of the three methods, is communicated to the vehicle operator whereby operation can be immediately suspended. Although the strut monitoring system of the '454 patent is effective in monitoring for strut failure, there is a continued need in the art to provide additional solutions to enhance the ability to monitor hauling conditions at a worksite to help reduce the occurrence of machine damage caused by poor hauling conditions at the worksite and to help identify locations along haul routes of the worksite that can be improved.

It will be appreciated that this background description has been created by the inventors to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

In one aspect of the present disclosure, embodiments of a machine are described. In one embodiment, the machine includes a frame, a suspension system, and a hauling condition monitoring system. The suspension system is mounted to the frame and includes a strut. The hauling condition monitoring system is supported by the frame. The hauling condition system includes a pressure sensor, a geolocation unit, a non-transitory computer-readable medium, a controller, and an interface device.

The pressure sensor is arranged with the strut to sense a strut pressure within the strut. The pressure sensor is configured to generate a strut pressure signal indicative of the strut pressure sensed by the pressure sensor. The geolocation unit is configured to generate a location signal indicative of a location of the machine.

The non-transitory computer-readable medium bears a hauling condition monitoring program that includes a graphical user interface. The controller is in operable communication with the pressure sensor to receive the strut pressure signal therefrom and with the geolocation unit to receive the location signal therefrom. The controller is in operable arrangement with the non-transitory computer-readable medium such that the controller is configured to execute the hauling condition monitoring program contained thereon. The interface device is in operable communication with the controller. The interface device is configured to display the graphical user interface of the hauling condition monitoring program.

The hauling condition monitoring program includes a strut pressure monitoring module, a tracking module, and a messaging module. The strut pressure monitoring module is configured to monitor the strut pressure signal for a hazard event. The hazard event occurs when a dynamic change in the strut pressure sensed by the pressure sensor exceeds a threshold amount. The tracking module is configured to track the location of the machine when the hazard event occurred. The messaging module is configured to display, through the graphical user interface, a hazard event message in the interface device indicating that the hazard event occurred when the dynamic change exceeds the threshold amount.

In yet another aspect of the present disclosure, embodiments of a system for monitoring hauling conditions of a machine are described. In one embodiment, a system for monitoring hauling conditions of a machine includes a pressure sensor, a geolocation unit, a non-transitory computer-readable medium, a controller, and an interface device.

The pressure sensor is adapted to be arranged with the strut to sense a strut pressure within the strut. The pressure sensor is configured to generate a strut pressure signal indicative of the strut pressure sensed by the pressure sensor. The geolocation unit is configured to generate a location signal indicative of a location of the machine.

The non-transitory computer-readable medium bears a hauling condition monitoring program that includes a graphical user interface. The controller is in operable communication with the pressure sensor to receive the strut pressure signal therefrom and with the geolocation unit to receive the location signal therefrom. The controller is in operable arrangement with the non-transitory computer-readable medium such that the controller is configured to execute the hauling condition monitoring program contained thereon. The interface device is in operable communication with the controller. The interface device is configured to display the graphical user interface of the hauling condition monitoring program.

The hauling condition monitoring program includes a strut pressure monitoring module, a tracking module, and a messaging module. The strut pressure monitoring module is configured to monitor the strut pressure signal for a hazard event. The hazard event occurs when a dynamic change in the strut pressure sensed by the pressure sensor exceeds a threshold amount. The tracking module is configured to track the location of the machine when the hazard event occurred. The messaging module is configured to display, through the graphical user interface, a hazard event message in the interface device indicating that the hazard event occurred when the dynamic change exceeds the threshold amount.

In still another aspect of the present disclosure, embodiments of a method of monitoring hauling conditions of a machine are described. In one embodiment, a method of monitoring hauling conditions of a machine includes sensing a strut pressure within the strut with a pressure sensor to generate a strut pressure signal indicative of the strut pressure sensed by the pressure sensor. A geolocation unit is operated to generate a location signal indicative of a location of the machine. The strut pressure signal and the location signal are transmitted to a controller.

The controller is used to execute a hauling condition monitoring program stored upon a non-transitory computer-readable medium to determine whether a hazard event occurred based upon the strut pressure signal. In response to the hauling condition monitoring program determining the hazard event occurred, the controller is used to execute the hauling condition monitoring program to display, through a graphical user interface, a hazard message in an interface device indicating the hazard event occurred.

Further and alternative aspects and features of the disclosed principles will be appreciated from the following detailed description and the accompanying drawings. As will be appreciated, the systems and methods for monitoring hauling conditions of a machine and machines incorporating the same which are disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

Figure 1:
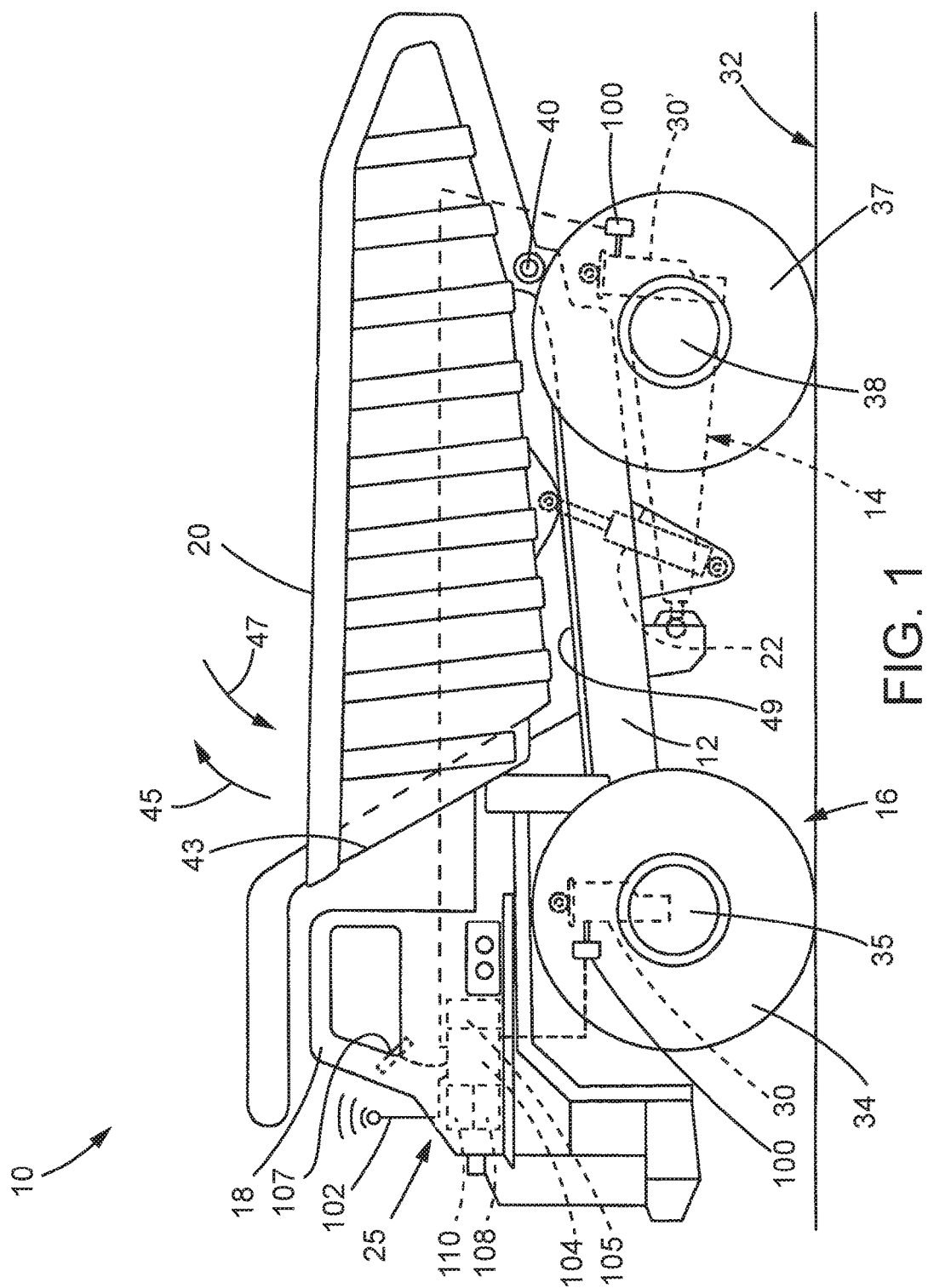
FIG. 1 is a diagrammatic side elevational view of an embodiment of a machine which includes an embodiment of a system for monitoring machine hauling conditions constructed in accordance with principles of the present disclosure.
Figure 2:
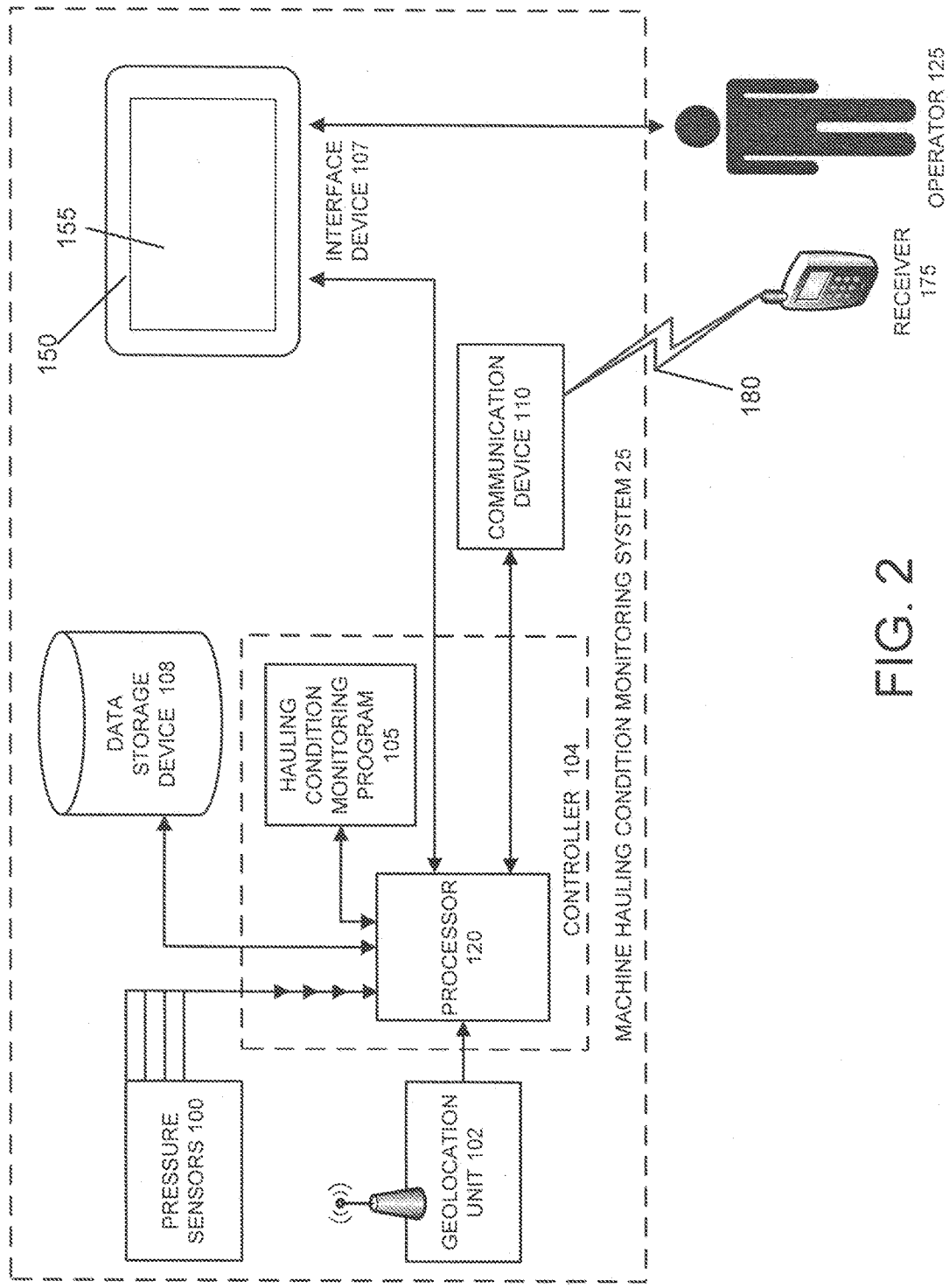
FIG. 2 is a schematic and diagrammatic view of an embodiment of a system for monitoring machine hauling conditions constructed in accordance with principles of the present disclosure.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Embodiments of machines and systems and methods for monitoring the hauling conditions for machines at a worksite are disclosed herein. In embodiments, the hauling conditions of the machines at a worksite are monitored based upon strut pressure sensor readings taken from the machines as they travel over the worksite.

In embodiments, a machine constructed according to principles of the present disclosure includes a frame, a suspension system mounted to the frame and having at least one strut, and a hauling condition monitoring system supported by the frame. The hauling condition monitoring system includes a pressure sensor arranged with each strut, a geolocation unit, a computer-readable medium bearing a hauling condition monitoring program, a controller, and an interface device. The controller is in operable communication with each pressure sensor and the geolocation unit to receive their signals and configured to execute the hauling condition monitoring program. The interface device is in operable communication with the controller and configured to display the hauling condition monitoring program's graphical user interface. The hauling condition monitoring program is configured to monitor the strut pressure signal(s) for a hazard event that occurs when a dynamic change in the strut pressure exceeds a threshold amount and to track the location of the machine when the hazard event occurred.

In embodiments, the hauling condition monitoring program includes a strut pressure monitoring module, a tracking module, and a messaging module. The strut pressure monitoring module is configured to monitor the strut pressure signal for a hazard event. The hazard event occurs when a dynamic change in the strut pressure sensed by the pressure sensor exceeds a threshold amount. The tracking module is configured to track the location of the machine when the hazard event occurred. The messaging module is configured to display, through the graphical user interface, a hazard event message in the interface device indicating that the hazard event occurred when the dynamic change exceeds the threshold amount.

In embodiments, a method of monitoring hauling conditions of a machine following principles of the present disclosure can be used to determine the existence of a rough location of a haul road at the worksite. In embodiments, the strut pressures for a number of different machines driving along the haul road can be monitored. A part of the haul road having an obstacle or other travel hazard (e.g., ruts, bumps, pot holes, excessive or imbalanced grading, etc.) will consistently give high variation or dynamic range in the strut pressures of the machines when they pass over that location. By monitoring the strut pressures of the machines and flagging a location at the worksite where strut pressure dynamic changes exceeding a threshold amount occur, a worksite manager can identify locations at the worksite that can be remediated to improve hauling efficiency and/or that can be marked for an operator to be aware that the obstacle exists and to modify the operation of the machine as it traverse the obstacle ("Warning: Bump Ahead. Slow down.").

Turning now to the Figures, there is shown in FIG. 1 an exemplary embodiment of a machine 10 constructed according to principles of the present disclosure which includes an embodiment of a system for monitoring machine hauling conditions. In the illustrated embodiment, the machine 10 is in the form of an off-highway truck and includes a frame 12, a suspension system 14, a ground-engaging system 16, an operator compartment 18, a dump body 20, a hydraulic cylinder 22, and a hauling condition monitoring system 25 constructed according to principles of the present disclosure.

In other embodiments, the principles disclosed herein can be incorporated and used with other suitable machines, such as machines that are used in industries including mining, construction, forestry, farming, etc. Non-limiting examples of other mobile machines that can be constructed according to principles of the present disclosure include commercial machines, such as other trucks, earth moving vehicles, mining vehicles, dozers, wheel loaders, material handling equipment, farming equipment, and other types of movable machines. In other embodiments, the machine 10 can have different forms, such as any other machine having a suspension system with at least one strut.

The suspension system 14 is mounted to the frame 12. The suspension system 14 can be provided to support the dump body 20 in a manner to provide dampened oscillatory motion between the ground-engaging system 16 and the dump body 20. In embodiments, the suspension system 14 includes at least one strut 30. In the illustrated embodiment, the suspension system 14 includes four struts 30, namely a front left strut 30, a front right strut (not shown), a rear left strut 30', and a rear right strut (not shown), arranged in a suitable manner as will be appreciated by one skilled in the art. The struts 30 can be disposed in supporting relation to the dump body 20 in any suitable manner known to those skilled in the art. In embodiments, the struts can be any suitable type of strut, such as, a gas-over-liquid type, for example, as will be appreciated by one skilled in the art. The pressure of the fluid within the strut 30 generally corresponds to the magnitude of the load applied to that strut 30.

The ground-engaging system 16 can be configured to engage the ground 32, or other surface, to propel the machine 10. In embodiments, the ground-engaging system 16 is mounted to the frame 12 such that the suspension system 14 is interposed between the frame 12 and the ground-engaging system 16.

In embodiments, the ground-engaging system 16 can include one or more suitable ground-engaging elements adapted to engage the ground to propel the machine 10. In the illustrated embodiment, the ground-engaging system 16 includes a plurality of front wheels 34 rotatably mounted to a front axle 35 and a plurality of rear wheels 37 rotatably mounted to a rear axle 38. In embodiments, the ground-engaging system 16 includes at least two front wheels 34 and at least two rear wheels 37. In other embodiments, the number of front wheels 34 and/or rear wheels 37 can vary. For example, in some embodiments, the ground-engaging system 16 can include two front wheels 34 (one on each side of the machine 10) and four rear wheels (two one each side of the machine 10).

In embodiments, the suspension system 14 includes at least one front strut 30 interposed between the frame 12 and the plurality of front wheels 34 and at least one rear strut 30' interposed between the frame 12 and the plurality of rear wheels 37. In the illustrated embodiment, the suspension system 14 includes a pair of front struts 30 associated with the front wheels 34 (one on each side of the machine 10) and a pair of rear struts 30' associated with the rear wheels 37 (one on each side of the machine 10).

The illustrated machine 10 is adapted to be controlled by an operator. The operator compartment 18 is supported by the frame 12 and is configured to hold one or more operators therein during operation of the machine 10.

The dump body 20 is pivotally connected to the frame 12 by a pivot pin 40 such that the dump body 20 is pivotally movable over a range of travel between a hauling position, as shown in FIG. 1, and one of several dumping positions in which a front end 43 of the dump body 20 is in an elevated position in relation to a rear end thereof. The hydraulic cylinder 22 is connected to the frame 12 and the dump body 20 such that the hydraulic cylinder 22 can be selectively extended to pivot the dump body 20 about the pivot pin 40 from the hauling position in a dumping direction 45 to one of several dumping positions and retracted to return the dump body 20 from the dumping position in a lowering direction 47 to the hauling position. The contents of the dump body 24 can be dispensed therefrom by controllably pressurizing the hydraulic cylinder 22 to pivotally move the dump body 24 about the pivot pin 26 from the hauling position shown in FIG. 1 to a selected dumping position.

During normal operation in the hauling mode, the hydraulic cylinder 22 does not support the weight of the dump body 20. In the hauling position, there is negligible pressure within the hydraulic cylinder 22, and the weight of the dump body 20 is transferred to the frame 12 through the pivot pin 40 and a pair of payload support rails 49 attached to the frame 12 (one on each side of the machine 10).

Referring to FIG. 1, the machine 10 includes an embodiment of a hauling condition monitoring system 25 constructed according to principles of the present disclosure. The hauling condition monitoring system 25 is configured to monitor hauling conditions at a worksite by evaluating the pressure within the struts 30, 30' of the machine 10 to detect when the machine 10 traverses over an obstacle in the hauling road upon which it is travelling. In embodiments, the hauling condition monitoring system 25 is configured to detect when the hazard event occurs when a dynamic change in the strut pressure sensed by the pressure sensor exceeds a threshold amount. In embodiments, the dynamic change exceeds the threshold amount when at least one of an amplitude spike exceeds a threshold spike value and a dynamic range value exceeds a threshold range value. In embodiments, the hauling condition monitoring system 25 is configured to compare a set of pressure sensor readings from a plurality of machines travelling over the worksite to determine whether a particular location constitutes a hazard.

The hauling condition monitoring system 25 is supported by the frame 12. The illustrated hauling condition monitoring system 25 includes a plurality of pressure sensors 100, a geolocation unit 102, a controller 104, a non-transitory computer-readable medium 105, an interface device 107, a data storage device 108, and a communication device 110.

One of the pressure sensors 100 is respectively positioned within each of the struts 30, 30'. Each pressure sensor 100 is operable to sense the pressure within the strut 30, 30' with which it is associated. It should be appreciated that the pressure of the fluid within each of the struts 30, 30' is related to a weight which is supported by the respective strut 30, 30', including a payload weight of material disposed within the dump body 20. Further, the pressure within the struts 30, 30' is normally subjected to oscillations while the machine 10 is traveling over the ground 32. The pressure oscillations can vary in frequency, magnitude, and/or range in response to the particular conditions of the ground 32 over which the machine 10 is travelling.

Figure 3:
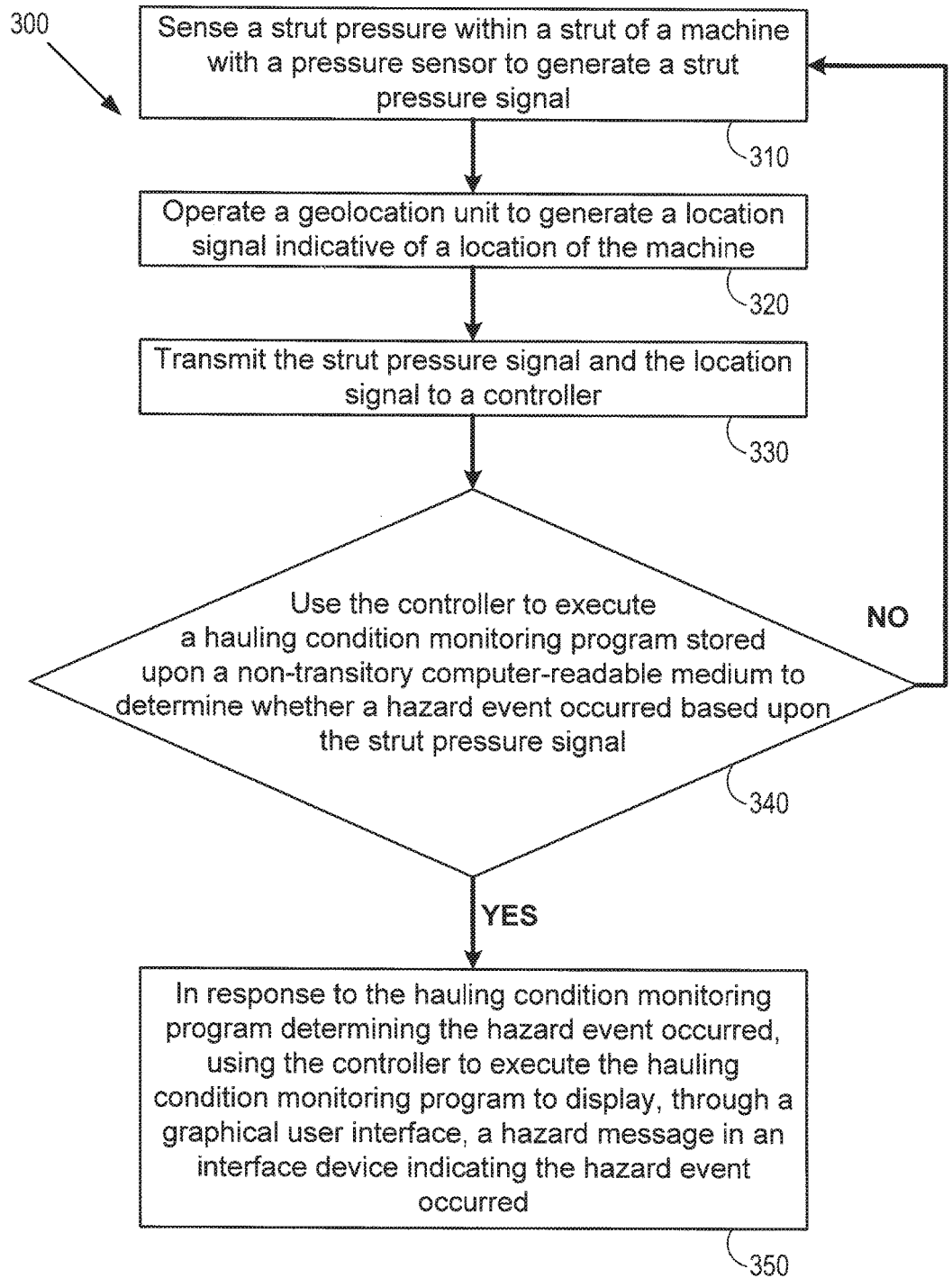
FIG. 3 is a flowchart illustrating steps of an embodiment of a method of monitoring machine hauling conditions at a worksite following principles of the present disclosure.

Referring to FIG. 3, there is shown a schematic and diagrammatic view of the hauling condition monitoring system 25 of the machine 10. Each of the pressure sensors 100 is arranged with one of the struts 30, 30' of the machine 10 to sense a strut pressure within the associated strut. Each of the pressure sensors 100 is configured to generate a respective strut pressure signal indicative of the strut pressure sensed by the particular pressure sensor 100. In embodiments, the pressure sensors 100 can comprise any suitable pressure sensor configured to sense a pressure within the associated strut and operable over a pressure range which matches the intended application of the machine 10. In embodiments, the pressure sensors 100 are configured to transmit a strut pressure signal substantially continuously to the controller 104.

The geolocation unit 102 is configured to generate a location signal indicative of a location of the machine 10. In embodiments, the geolocation unit 102 can comprise any suitable device configured to determine the location of the machine 10 and to send a location signal indicative of an absolute location (including, e.g., latitude, longitude, and altitude information) of the machine 10 to the controller 104. For example, in embodiments, the geolocation unit comprises a Global Positioning System (GPS) receiver. In embodiments, the GPS receiver 102 is configured to generate a location signal that includes a latitudinal position and a longitudinal position.

In other embodiments, the geolocation unit 102 can comprise a portion of an Inertial Reference System (IRS), a local tracking system, or another known locating system that receives or determines positional information associated with the machine 10. Suitable technologies for geolocation include, but are not limited to, the U.S. Global Positioning System, the Russian GLONASS satellite-based system, the European Galileo satellite-based system, and radio-positioning systems provided by Locata Corporation of Canberra, Australia, for example. In embodiments, the geolocation unit 102 can be configured to receive and process geolocation signals from multiple systems to generate the location signal sent to the controller 104. In some embodiments, the location signal generated by the geolocation unit 102 can be conveyed to a remotely-located central station via the communication device 110 to convey signals indicative of the received or determined positional information of the machine 10 for further processing.

The controller 104 is in operable communication with the pressure sensors 100 to receive the respective strut pressure signals therefrom and with the geolocation unit 102 to receive the location signal therefrom. The controller 104 is in operable arrangement with the non-transitory computer-readable medium 105 such that the controller 104 is configured to execute the hauling condition monitoring program contained thereon. The controller 104 is also operably arranged with the interface device 107, the data storage device 108, and the communication device 110.

The controller 104 can include a processor 120 and be programmed with the hauling condition monitoring program contained upon the non-transitory, tangible computer-readable storage medium 105. When executed by the processor 120, the hauling condition monitoring program 105 provides the controller 104 with the functionality to monitor the strut pressure of the machine 10 (based upon the readings from the pressure sensors 100) to determine whether the machine 10 has encountered an obstacle along the haul road (or other surface of the ground 32) that constitutes a hazard. In embodiments, the hazard event can be considered to be any event that could potentially damage the machine and/or contribute to the reduction in the service life of one or more components of the machine. In other embodiments, the hazard event can constitute a location at which safety and/or payload considerations indicate that one or more operating conditions of the machine should change in order to promote the safety of the machine 10 and its operator(s) 125 and/or the efficient transportation of the material within the dump body 20 of the machine 10. In embodiments, the hauling condition monitoring program 105 provides the controller 104 with the functionality to track the location of each hazard event it detects at the worksite.

In embodiments, the processor 120 can generally include any component of an application that can receive input from a client or the interface device 107, process the input, present the input to the hauling condition monitoring program 105, and present output from the processor 120 to a client (such as a remotely-located central processing unit), the interface device 107, and/or to the data storage device 108, and execute logic for the hauling condition monitoring program 105. In embodiments, the controller 104 can include one or more processors that can execute instructions and process data to perform one or more functions associated with the hauling condition monitoring system 25. For instance, the controller 104 can execute software that enables the hauling condition monitoring system 25 to request and/or receive data from outside of the hauling condition monitoring system 25, such as operational data pertaining to the machine 10 from one or more other systems and/or fleet hazard event data from another machine and/or a central computer system in communication with a number of machines that each include a hauling condition monitoring system constructed according to principles of the present disclosure. The controller 104 can also execute software that enables the hauling condition monitoring system 25 to determine the location of each hazard event previously determined to have occurred within a predetermined period of time (by any such machine generating hazard event data) at a worksite at which the machine 10 is located.

In embodiments, the controller 104 is configured to communicate to another processing unit, such as a central computer system with which a fleet of machines having a hauling condition monitoring system constructed according to principles of the present disclosure is in communication. In embodiments, the controller 104 is configured to transmit a hazard event signal to the off board processing unit. In embodiments, the hazard event signal can include data generated by the hauling condition monitoring system 25, including, e.g., strut pressure data and corresponding location data.

The non-transitory computer-readable medium 105 bears a hauling condition monitoring program constructed according to principles of the present disclosure. The hauling condition monitoring program 105 includes a graphical user interface. In embodiments, the hauling condition monitoring program 105 is configured to monitor the strut pressure signals from the pressure sensors 100 to determine whether the machine 10 has encountered a hazard as it moves about the worksite and, if so, to track the location where such hazard event occurred. In embodiments, the hauling condition monitoring program 105 is configured to carry out any method (or steps of a method) of monitoring hauling conditions of the machine 10 that follows principles of the present disclosure. In embodiments, the hauling condition monitoring program 105 can include a strut pressure monitoring module, a tracking module, a messaging module, and a mapping module.

The strut pressure monitoring module can be configured to monitor the strut pressure signals from each of the pressure sensors 100 for an occurrence of a hazard event. In embodiments, the hazard event occurs when a dynamic change in the strut pressure sensed by at least one of the pressure sensors 100 exceeds a threshold amount. In embodiments, the dynamic change exceeds the threshold amount when at least one of an amplitude spike exceeds a threshold spike value and a dynamic range value exceeds a threshold range value. In embodiments where the hauling condition monitoring system 25 includes more than one pressure sensor 100, the strut pressure monitoring module can be configured to identify which one of the pressure sensors 100 has sensed a dynamic change that exceeds the threshold amount.

In embodiments, the strut pressure monitoring module can be configured to monitor the strut pressure signals from each of the pressure sensors 100 substantially continuously for an occurrence of a hazard event. In embodiments, the strut pressure monitoring module can be configured to monitor the strut pressure signals from each of the pressure sensors 100 only when the machine 10 is moving. In some embodiments, the strut pressure monitoring module can use the location signal from the geolocation unit 102 to determine whether the machine is moving. In still other embodiments, a velocity of the machine 10 from an on-board module of the machine can be in communication with the controller 104, and its velocity reading can be used by the strut pressure monitoring module.

In embodiments, the strut pressure monitoring module of the hauling condition monitoring program 105 is configured to determine whether a hazard event occurred based upon comparing the strut pressure signal(s) to a database of strut pressure data stored in the data storage device 108. In embodiments, the strut pressure monitoring module is configured to compare the dynamic change in the strut pressure sensed by the pressure sensor at a present time to the historical set of dynamic strut pressure changes occurring at the location to determine whether the hazard event occurred. In embodiments, the historical set of dynamic strut pressure changes can be stored in the form of a database in the data storage device 108. In embodiments, the database of historical dynamic strut pressure for a given location at the worksite can be populated from a plurality of machines equipped with a hauling condition monitoring system 25 constructed according to principles of the present disclosure that travel over the same location. In some embodiments, the historical set of dynamic strut pressure changes for a given location at the worksite can be limited to a particular period of time. In some embodiments, dynamic strut pressure readings for a particular location that were made prior to a certain time (e.g., prior to a road remediation, for example) can be eliminated from the historical set of dynamic strut pressure changes and/or excluded from consideration by the strut pressure monitoring module. In embodiments, a suitable statistical analysis technique applied to the database of hazard event data can be used to monitor the strut pressure signals of the machine to determine whether a hazard event occurred.

The tracking module can be configured to track the location of the machine 10 when the hazard event occurred. In embodiments, the tracking module can use the data in the location signal from the geolocation unit 102 to determine the location at which the hazard event occurred. In embodiments, the tracking module can also store the time at which the machine travelled over the location and experienced the hazard event.

In embodiments, the tracking module can be configured to store the location and/or time data relating to the hazard events experienced by the machine 10 in the data storage device 108. In embodiments, the tracking module is configured to track the location of the machine 10 while the machine 10 is moving using the location signal from the geolocation unit 102 and to compare the location of the machine 10 with the set of hazard locations in the data storage device 108 to determine when the machine 10 is within a predetermined hazard distance from at least one of the set of hazard locations. In embodiments, the geolocation unit 102 can be configured to include heading data in the location signal indicating the direction in which the machine 10 is travelling to help the tracking module determine whether the machine 10 is moving closer to or farther from a hazard location.

In embodiments, the controller 104 is adapted to assemble a hazard event indicator (such as in the form of a first pop-up message) from data in the data storage device 108 in response to receiving an indication from the strut pressure monitoring module of the hauling condition monitoring program 105 that the machine 10 travelled over a hazard. In embodiments, the messaging module can be configured to display, through the graphical user interface, a hazard event message in the interface device 107 indicating that the hazard event occurred when the dynamic change exceeds the threshold amount. The controller 104 can transmit the hazard event message to the interface device 107 for display to the operator 125 via the graphical user interface of the hauling condition monitoring program 105. The hazard event message can include data describing the hazard event, including for example the location(s) of the strut 30, 30' which experienced the dynamic change in strut pressure the indicated the occurrence of the hazard event and a severity value for the hazard event based upon a finite scale (e.g., on a scale from 1 to 10). In other embodiments, the hazard event indicator can take the form of an audible sound emitted by a speaker associated with the interface device 107.

In embodiments, the controller 104 is adapted to assemble a warning indicator from data in the data storage device 108 in response to receiving an indication from the tracking module of the hauling condition monitoring program 105 that machine 10 is within a predetermined hazard distance from at least one of the set of hazard locations. In embodiments, the messaging module can be triggered to compile a suitable warning indicator when the machine 10 is within a predetermined hazard distance from at least one of the set of hazard locations. The messaging module can be configured to display, through the graphical user interface, a hazard-approaching message in the interface device 107 indicating that the machine 10 is approaching a hazardous area when the tracking module determines the machine 10 is within the predetermined hazard distance. In embodiments, the warning indicator includes at least one of a visible image (such as a second pop-up message displayed by the graphical user interface in the interface device 107) and an audible sound.

The mapping module can be configured to generate a hazard map of the worksite using the database of hazard event data in the data storage device. In embodiments, the hazard map includes a hazard indicator at each of the set of hazard locations for the set of hazard events. In embodiments, the mapping module can be configured to display, through the graphical user interface, the hazard map in the interface device 107. In embodiments, the mapping module can be configured such that the hazard indicator at the location of each of the set of hazard locations is configured to indicate at least one of a number and a number range of hazard events that occurred at the location within a predefined period of time.

In embodiments, an on-board module can be configured to be in communication with the controller 104 such that the on-board module transmits information to the controller 104 concerning the operation of the machine 10 such that the controller 104 can use the operation information to help identify whether a hazard event occurred. The on-board module can be interconnected with a variety of other modules and/or sensors as will be appreciated by one skilled in the art. For example, an on-board module can include an Engine Control Module (ECM), a power system control module, an attachment interface that connects one or more sub-components, and any other type of device that the machine 10 can use to facilitate and/or monitor operations of the machine 10 during run time or non-run time conditions (i.e., the engine of the machine 10 running or not running, respectively). In such embodiments, the controller 104 can be adapted to respond to signals received from the sensors either directly or indirectly through the on-board module.

The interface device 107 is in operable communication with the controller 104. The interface device 107 is configured to display the graphical user interface of the hauling condition monitoring program 105.

The operator 125 can use the interface device 107 to receive information from the hauling condition monitoring program 105 and to provide inputs to the controller 104 through the interface device 107. The interface device 107 can be configured to provide the operator 125 with an operable interface to other systems of the machine 10.

The interface device 107 is coupled to the controller 104 to receive hazard event data therefrom. In embodiments, an audio device can be associated with the interface device 107 to provide audibly-perceptible information through a speaker. In embodiments, the hauling condition monitoring program 105 can be configured such that the interface device 107 can display a hazard map generated by the mapping module of the hauling condition monitoring program 105 and any suitable message compiled by the messaging module regarding the occurrence of a hazard event and/or the approach of a hazard location. In the illustrated embodiment, the interface device 107 is adapted to provide information in the form of visibly-displayed indicia.

The interface device 107 can include hardware and/or software components configured to allow the operator 125 to access information stored in the data storage device 108. For example, the graphical user interface of the hauling condition monitoring program 105 can include a data access interface configured to allow the operator 125 to access, configure, store, and/or download information to an off-board system or a receiver 175, such as a computer, a personal digital assistant (PDA) or smart phone using a particularly-configured mobile application ("app"), a diagnostic tool, or any other type of data device. Moreover, the interface device 107 can be configured to allow the operator 125 to access and/or modify information, such as operational parameters, operating ranges, hazard event information for a variety of locations, and/or threshold levels associated with one or more hazard event configurations, stored in the data storage device 108.

In the illustrated embodiment, the interface device 107 is mounted within the operator compartment 18 (see FIG. 1). In other embodiments, the interface device 107 can be located elsewhere, including a location remote from the machine 10.

The illustrated embodiment of the interface device 107 comprises a liquid crystal display device 150. In embodiments, the liquid crystal display device 150 can be mounted within a panel configuration in the operator compartment 18 or as a stand-alone device.

In embodiments, the interface device 107 can comprise another type of display, a console, a keyboard, push buttons, voice recognition devices, a laptop computer, speakers, and/or other interfaces, as will be appreciated by one skilled in the art. In embodiments, the interface device 107 can include any type of display device that presents information.

The illustrated liquid crystal display device 150 includes a display screen in the form of a touch screen 155 adapted to display information to the operator 125 of the machine 10 and to receive instructions from the operator 125 for transmission to the controller 104 via finger touch input. The touch screen 155 can include a message display section adapted to selectively display a plurality of pop-up messages, such as those generated by the controller 104 using the hauling condition monitoring program 105. In other embodiments, the interface device 107 can include a different type of display screen.

The touch screen 155 can be any suitable size, such as a seven-inch screen, for example, with any suitable aspect ratio, such as 1.66:1 or industry reference "Super 16," for example. The touch screen 155 can be selectively activated using capacitive-touch technology as is well known to those skilled in the art. The touch screen 155 can be configured to detect anything which is conductive or has a dielectric different from that of air. In embodiments, the touch screen 155 can be activated based on a human finger touch applying a predetermined amount of force to the touch screen 155. In embodiments, the touch screen 155 can be configured to respond to immediate touch activation, push and hold activation, and activation upon lift off. In embodiments, the brightness and/or color of the background of the display screen 155 can be adjusted. For example, in some embodiments, the display screen 155 can be toggled between a day mode and a night mode, for example. The day mode can have a different color scheme and/or brightness than the night mode.

The data storage device 108 is in operable communication with the controller 104. The data storage device 108 can generally include any type of system for storing data in non-volatile storage. This includes, but is not limited to, systems based upon: magnetic, optical, and magneto-optical storage devices, as well as storage devices based on flash memory and/or battery-backed up memory. The data storage device 108 can include a removable memory module, or a fixed memory module, or a combination of removable and fixed memory modules.

In embodiments, the data storage device 108 can include an on-board memory device and/or a remotely-located off-board memory device that can be placed in communication with the controller 104 via the communication device 110. In embodiments, the data storage device 108 includes an off-board memory device that is in communication with a central processing unit that is in communication with a number of machines 10 having a hauling condition monitoring system 25 constructed according to principles of the present disclosure that includes at least one strut 30 with a corresponding pressure sensor 100.

The data storage device 108 can include one or more memory devices that store, organize, sort, filter, and/or arrange data used by the hauling condition monitoring program 105. For example, in embodiments, the data storage device 108 includes a database of hazard event data for a worksite. In embodiments, the hazard event data can include any information generated by the hauling condition monitoring program 105.

In embodiments, the hazard event data includes a set of hazard events and a set of hazard locations corresponding to the set of hazard events that the hauling condition monitoring system 25 has generated. In embodiments, the hazard event data includes the strut pressure signal data from each sensor, the location signal data from the geolocation unit 102, and time coded information to correlate the strut pressure signal data and the location signal data to a particular point in time.

In embodiments, the data storage device 108 includes a database of hazard event data that includes a historical set of dynamic strut pressure changes occurring at a plurality of locations at a worksite. In embodiments, the strut pressure monitoring module of the hauling condition monitoring program 105 can compare strut pressure signals from the struts 30, 30' of the machine as it travels over a given location against the historical set of dynamic strut pressure changes that have occurred at that location. In embodiments, the historical set of dynamic strut pressure changes can be populated with data from the machine 10 itself and/or a number of machines 10 having a hauling condition monitoring system 25 constructed according to principles of the present disclosure that includes at least one strut 30 with a corresponding pressure sensor 100.

In embodiments, the data storage device 108 includes a database of hazard events that can be organized within a plurality of geographic outline areas called map units. In embodiments, the worksite can be broken up into a plurality of contiguous map units and hazard events occurring within the worksite can be associated with one of the map units. The map unit data can include the number of hazard events that have occurred within the particular map unit and the date/time when each such hazard event occurred. The tracking module of the hauling condition monitoring program 105 can be configured to correlate the location of the machine 10 with one of the plurality of map units and to identify the hazard severity of the map unit within which the machine 10 is located based upon the number of hazard events occurring within the map unit and the timing of when those hazard events occurred.

In embodiments, the data storage device 108 can be adapted to store message data for use by the messaging module of the hauling condition monitoring program 105 in generating a message indicator and/or a warning indicator (such as in the form of at least one pop-up message). In embodiments, the data storage device 108 stores message data for a plurality of pop-up messages relating to hazard event information.

In embodiments, to the extent that the machine 10 moves to a new location at which the particular hazard conditions of the new location differ from the previous location, the hauling condition monitoring program 105 can update the hazard event data used by the hauling condition monitoring system 25 to determine the hauling conditions for the machine 10 at the new worksite. When the hauling conditions at the worksite have changed significantly (such as by undergoing a reconfiguration or a remediation), the controller 104 can reset the information in the data storage device 108 to reflect the new or repaired hauling conditions at the worksite.

In response to a command received from the interface device 107, for example, the controller 104 can be used to display hazard event data stored in the data storage device 108 through the graphical user interface of the hauling condition monitoring program 105 via the interface device 107. The information in the data storage device 108 can be selectively transmitted to the operator 125 via the interface device 107 and/or to the off-board receiver 175 via the communication device 110.

The communication device 110 is in operable arrangement with the controller 104 to communicatively transmit information from the hauling condition monitoring system 25 to a suitable, off-board device, such as the receiver 175, for example. In embodiments, the communication device 110 is configured to transmit a hazard event signal to the receiver 175, which is unsupported by the frame 12 of the machine 10.

In embodiments, the hazard event signal contains hazard event data from the hauling condition monitoring system 25. For example, in embodiments, the hazard event signal contains hazard event data indicating the occurrence of one or more hazard events and a time and place of occurrence for each such hazard event.

In embodiments, the communication device 110 can comprise any suitable equipment that facilitates the transmission of data between the hauling condition monitoring system 25 and an off board device, such as the receiver 175 or a central computer system located remotely from the machine 10. In embodiments, the communication device 110 can include hardware and/or software configured to send and/or receive data through a wireless communication link 180 across a wireless networking platform such as, for example, a satellite communication system. Alternatively and/or additionally, the communication device 110 can include one or more broadband communication platforms configured to communicatively couple the hauling condition monitoring system 25 to an off board system, such as, for example, cellular, Bluetooth, microwave, point-to-point wireless, point-to-multipoint wireless, multipoint-to-multipoint wireless, or any other appropriate communication platform for networking a number of components.

In embodiments, the communication device 110 can be configured to establish a direct data link with an external data storage device. In embodiments, the external data storage device can be a part of the central computer system or in the form of a portable device for downloading the data from the hauling condition monitoring system 25 and uploading the information to the central computer system, for example. In embodiments, the communication device 110 can include a wired network, such as, for example, Ethernet, fiber optic, waveguide, or any other type of wired communication network.

In embodiments, the communication device 110 uses a cellular network to transmit hazard event data to the receiver 175 which is in the form of a smart phone having a mobile app loaded thereon to visibly display the hazard event data. In embodiments, the mobile app can be used to display the graphical user interface of the hauling condition monitoring system 25 on the smart phone 175 to allow a user to input commands to the hauling condition monitoring system 25 remotely using the smart phone 175 and to receive output therethrough in a manner similar to that using the interface device 107.

In embodiments, the central computer system/receiver 175 is configured to perform additional hazard event analysis remotely from the machine 10 and to transmit the additional hazard event data back to the hauling condition monitoring system 25 for further use in operating the machine 10. In addition, the central computer system/receiver 175 can be configured to monitor a fleet of machines at the worksite via a centralized processing unit.

In embodiments, an embodiment of a machine including a hauling condition monitoring system constructed according to principles of the present disclosure can be used to carry out a method of monitoring hauling conditions of a machine in accordance with principles of the present disclosure to determine the location of hauling hazards about a worksite. Referring to FIG. 3, steps of an embodiment of a method 300 of monitoring hauling conditions of a machine following principles of the present disclosure are shown.

In the method 300 of monitoring machine hauling conditions, a strut pressure within the strut is sensed with a pressure sensor to generate a strut pressure signal indicative of the strut pressure sensed by the pressure sensor (step 310). A geolocation unit is operated to generate a location signal indicative of a location of the machine (step 320). The strut pressure signal and the location signal are transmitted to a controller (step 330).

In embodiments, the geolocation unit comprises a GPS receiver that is configured to generate the location signal. In embodiments, the location signal includes a latitudinal position and a longitudinal position of the machine.

The controller is used to execute a hauling condition monitoring program stored upon a non-transitory computer-readable medium to determine whether a hazard event occurred based upon the strut pressure signal (step 340). In embodiments, the hauling condition monitoring program determines the hazard event occurred by monitoring the strut pressure signal for an occurrence when a dynamic change in the strut pressure sensed by the pressure sensor exceeds a threshold amount. In embodiments, the threshold amount is at least one of an amplitude spike exceeding a threshold spike value and a dynamic range value exceeding a threshold range value. In embodiments, the hauling condition monitoring program determines whether the hazard event occurred by comparing the strut pressure signal at a present time to a historical set of dynamic strut pressure changes occurring at the location. In embodiments, any suitable statistical technique can be used to determine a suitable threshold amount for the dynamic change of the strut pressure.

In response to the hauling condition monitoring program determining the hazard event occurred, the controller is used to execute the hauling condition monitoring program to display, through a graphical user interface, a hazard message in an interface device indicating the hazard event occurred (step 350). In embodiments, a method following principles of the present disclosure further includes using the controller to execute the hauling condition monitoring program to display, through the graphical user interface, a hazard-approaching warning message in the interface device indicating the machine is approaching a historical hazard event site in response to the machine being within a predetermined hazard distance from the historical hazard event site. In embodiments, the warning message includes at least one of a visible image and an audible sound.

In embodiments, the machine includes an operator compartment, and the interface device is mounted within the operator compartment. In embodiments, the method further includes displaying in the interface device, through the graphical user interface, a message containing hauling hazard data.

In embodiments of a method of monitoring hauling conditions of a machine in accordance with principles of the present disclosure, the machine includes a communication device that is in operable connection with the controller. The method of monitoring machine hauling conditions can further include using the controller to transmit a hazard event signal to a receiver via the communication device where the receiver is located off board of the machine. In embodiments, the hazard event signal contains strut pressure data and corresponding location data. In embodiments, the communication device uses a cellular network to transmit hazard event data generated by the machine to the receiver which is in the form of a central processing unit that is in communicative arrangement with a number of such machines at the worksite.

INDUSTRIAL APPLICABILITY

The industrial applicability of the embodiments of a machine, a hauling condition monitoring system, and a method of monitoring hauling conditions of a machine described herein will be readily appreciated from the foregoing discussion. The described principles are applicable to a variety of machines and worksite. Using principles of the present disclosure, the presence of one or more hazards along the hauling roads of the worksite can be determined based upon the actual environmental conditions encountered by the machine(s) at the worksite when in service.

Furthermore, worksite management can use the hazard event data generated by the machines incorporating a hauling condition monitoring system constructed according to principles of the present disclosure to identify operator mishandling of the machine and/or to improve the conditions of the haul roads at the worksite. A hauling condition monitoring system constructed according to principles of the present disclosure can be used to identify rough spots along a haul road at the worksite. Workers can then take corrective action to mitigate the rough spot and/or to identify the location of the rough spot along the haul road to reduce its negative impact upon the machines that use that particular haul road.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A machine comprising:
   a frame;
   a suspension system, the suspension system mounted to the frame and including a strut; and
   a hauling condition monitoring system, the hauling condition monitoring system supported by the frame and including:
      a pressure sensor, the pressure sensor arranged with the strut to sense a strut pressure within the strut, the pressure sensor configured to generate a strut pressure signal indicative of the strut pressure sensed by the pressure sensor,
      a geolocation unit, the geolocation unit configured to generate a location signal indicative of a location of the machine,
      a non-transitory computer-readable medium, the non-transitory computer-readable medium bearing a hauling condition monitoring program, the hauling condition monitoring program including a graphical user interface,
      a controller, the controller in operable communication with the pressure sensor to receive the strut pressure signal therefrom and with the geolocation unit to receive the location signal therefrom, the controller in operable arrangement with the non-transitory computer-readable medium such that the controller is configured to execute the hauling condition monitoring program contained thereon,
      an interface device, the interface device in operable communication with the controller, the interface device configured to display the graphical user interface of the hauling condition monitoring program, and
      a data storage device, the data storage device in operable communication with the controller, the data storage device including a database of hazard event data for a worksite, including data corresponding to a historical set of dynamic strut pressure changes occurring at a plurality of locations at the worksite from a plurality of machines, including said machine,
   wherein the hauling condition monitoring program includes a strut pressure monitoring module, a tracking module, and a messaging module,
   wherein the strut pressure monitoring module is configured to monitor the strut pressure signal for a hazard event, the hazard event occurring when a dynamic change in the strut pressure sensed by the pressure sensor exceeds a threshold amount,
   wherein the tracking module is configured to track the location of the machine when the hazard event occurred,
   wherein the messaging module is configured to display, through the graphical user interface, a hazard event message in the interface device indicating that the hazard event occurred when the dynamic change exceeds the threshold amount,
   wherein the strut pressure monitoring module is configured to compare the dynamic change in the strut pressure sensed by the pressure sensor at a present time at a present location of the machine to the data of the historical set of dynamic strut pressure changes occurring at the present location, from the plurality of machines, to determine whether the hazard event occurred, and
   wherein the data of the historical set of dynamic strut pressure changes for the present location is limited to data within a predetermined period of time prior to the present time, data prior to the predetermined period of time having been excluded from consideration as the data of the historical set of dynamic strut pressure changes for the present location.

2. The machine according to claim 1, further comprising:
   an operator compartment supported by the frame;
   wherein the interface device is mounted within the operator compartment.

3. The machine according to claim 1, further comprising:
   a ground-engaging system, the ground-engaging system mounted to the frame such that the suspension system is interposed between the frame and the ground-engaging system.

4. The machine according to claim 3, wherein the ground-engaging system includes a plurality of front wheels rotatably mounted to a front axle and a plurality of rear wheels rotatably mounted to a rear axle, the strut comprises a first strut, the suspension system includes a second strut, the first strut being interposed between the frame and the plurality of front wheels, and the second strut being interposed between the frame and the plurality of rear wheels, the pressure sensor comprises a first pressure sensor, and the hauling condition monitoring system includes a second pressure sensor, the second pressure sensor arranged with the second strut to sense a second strut pressure within the second strut, the second pressure sensor configured to generate a second strut pressure signal indicative of the second strut pressure sensed by the second pressure sensor, the controller in operable communication with the second pressure sensor to receive the second strut pressure signal therefrom, and the strut pressure monitoring module configured to monitor the second strut pressure signal for an occurrence of the hazard event.

5. The machine according to claim 1, wherein the controller is configured to transmit a hazard event signal, the hazard event signal containing strut pressure data and corresponding location data, and the hauling condition monitoring system further includes a communication device, the communication device in operable arrangement with the controller to communicatively transmit the hazard event signal to a receiver unsupported by the frame.

6. The machine according to claim 5, wherein the hazard event signal contains hazard event data indicating the hazard event occurred and a time and place of occurrence for the hazard event.

7. A system for monitoring hauling conditions of a machine, the machine including a frame and a suspension system, the suspension system mounted to the frame and including a strut, the system comprising:
   a pressure sensor, the pressure sensor adapted to be arranged with the strut to sense a strut pressure within the strut, the pressure sensor configured to generate a strut pressure signal indicative of the strut pressure sensed by the pressure sensor;
   a geolocation unit, the geolocation unit configured to generate a location signal indicative of a location of the machine;
   a non-transitory computer-readable medium, the non-transitory computer-readable medium bearing a hauling condition monitoring program, the hauling condition monitoring program including a graphical user interface;

a controller, the controller in operable communication with the pressure sensor to receive the strut pressure signal therefrom and with the geolocation unit to receive the location signal therefrom, the controller in operable arrangement with the non-transitory computer-readable medium such that the controller is configured to execute the hauling condition monitoring program contained thereon;

an interface device, the interface device in operable communication with the controller, the interface device configured to display the graphical user interface of the hauling condition monitoring program; and a data storage device, the data storage device in operable communication with the controller, the data storage device including a database of hazard event data for a worksite, including data corresponding to a historical set of dynamic strut pressure changes occurring at a plurality of locations at the worksite from a plurality of machines, including said machine, wherein the hauling condition monitoring program includes a strut pressure monitoring module, a tracking module, and a messaging module, wherein the strut pressure monitoring module is configured to monitor the strut pressure signal for a hazard event, the hazard event occurring when a dynamic change in the strut pressure sensed by the pressure sensor exceeds a threshold amount, wherein the tracking module is configured to track the location of the machine when the hazard event occurred, wherein the messaging module is configured to display, through the graphical user interface, a hazard event message in the interface device indicating that the hazard event occurred when the dynamic change exceeds the threshold amount, wherein the strut pressure monitoring module is configured to compare the dynamic change in the strut pressure sensed by the pressure sensor at a present time at a present location of the machine to the data of the historical set of dynamic strut pressure changes occurring at the present location, from the plurality of machines, to determine whether the hazard event occurred, and wherein the data of the historical set of dynamic strut pressure changes for the present location is limited to data within a predetermined period of time prior to the present time, data prior to the predetermined period of time having been excluded from consideration as the data of the historical set of dynamic strut pressure changes for the present location.

8. The system according to claim 7, wherein the geolocation unit comprises a GPS receiver, and the location signal includes a latitudinal position and a longitudinal position.

9. The system according to claim 7, wherein the dynamic change exceeds the threshold amount when at least one of an amplitude spike exceeds a threshold spike value and a dynamic range value exceeds a threshold range value.

10. The system according to claim 7,
wherein the database of hazard event data includes data corresponding to a set of hazard events and data corresponding to a set of hazard locations corresponding to the set of hazard events, and
wherein the hauling condition monitoring program includes a mapping module, the mapping module being configured to generate a hazard map of the worksite using the database of hazard event data in the data storage device, the hazard map including a hazard indicator at each of the set of hazard locations for the set of hazard events.

11. The system according to claim 10, wherein the mapping module is configured to display, through the graphical user interface, the hazard map in the interface device, the mapping module configured such that the hazard indicator at the location of each of the set of hazard locations is configured to indicate at least one of a number and a number range of hazard events that occurred at the location within a predefined period of time.

12. The system according to claim 10, wherein the tracking module is configured to track the location of the machine while the machine is moving and to compare the location of the machine with the set of hazard locations to determine when the machine is within a predetermined hazard distance from at least one of the set of hazard locations, and the messaging module is configured to display, through the graphical user interface, a hazard-approaching message in the interface device indicating that the machine is approaching a hazardous area when the tracking module determined the machine is within the predetermined hazard distance.

13. The system according to claim 10,
wherein the machine comprises a first machine, and
wherein the database of hazard event data includes data received from at least a second machine equipped with a corresponding strut and a corresponding pressure sensor.

14. A method of monitoring hauling conditions of a machine, the machine including a frame and a suspension system, the suspension system mounted to the frame and including a strut, the method comprising:

sensing a strut pressure within the strut with a pressure sensor to generate a strut pressure signal indicative of the strut pressure sensed by the pressure sensor;

operating a geolocation unit to generate a location signal indicative of a location of the machine;

providing, in a data storage device in operable communication with a controller, a database of hazard event data for a worksite, including data corresponding to a historical set of dynamic strut pressure changes occurring at a plurality of locations at the worksite from a plurality of machines, including said machine;

transmitting the strut pressure signal and the location signal to the controller;

using the controller to execute a hauling condition monitoring program stored upon a non-transitory computer-readable medium to determine whether a hazard event occurred based upon the strut pressure signal; and in response to the hauling condition monitoring program determining the hazard event occurred, using the controller to execute the hauling condition monitoring program to display, through a graphical user interface, a hazard message in an interface device indicating the hazard event occurred, wherein said determining whether the hazard event occurred includes comparing a dynamic change in the strut pressure sensed by the pressure sensor at a present time at a present location of the machine to the data of the historical set of dynamic strut pressure changes occurring at the present location, from the plurality of machines, to determine whether the hazard event occurred, and wherein the data of the historical set of dynamic strut pressure changes for the present location is limited to data within a predetermined period of time prior to the present time, data prior to the predetermined period of time having been excluded from consideration as the data of the historical set of dynamic strut pressure changes for the present location.

15. The method according to claim 14, wherein the machine includes an operator compartment, and the interface device is mounted within the operator compartment.

16. The method according to claim 14, wherein the machine includes a communication device, the communication device being in operable connection with the controller, the method further comprising:

using the controller to transmit a hazard event signal to a receiver via the communication device, the hazard event signal containing strut pressure data and corresponding location data, and the receiver being located off board of the machine.

17. The method according to claim 14, wherein the hauling condition monitoring program determines the hazard event occurred by monitoring the strut pressure signal for an occurrence when the dynamic change in the strut pressure sensed by the pressure sensor exceeds a threshold amount, the threshold amount being at least one of an amplitude spike exceeding a threshold spike value and a dynamic range value exceeding a threshold range value.

18. The method according to claim 14, further comprising:

using the controller to execute the hauling condition monitoring program to display, through the graphical user interface, a hazard-approaching warning message in the interface device indicating the machine is approaching a historical hazard event site in response to the machine being within a predetermined hazard distance from the historical hazard event site.

\* \* \* \* \*